Jan. 18, 1927.
K. R. MANVILLE
1,614,749
VALVE FOR INTERNAL COMBUSTION MOTORS
Filed May 12, 1923
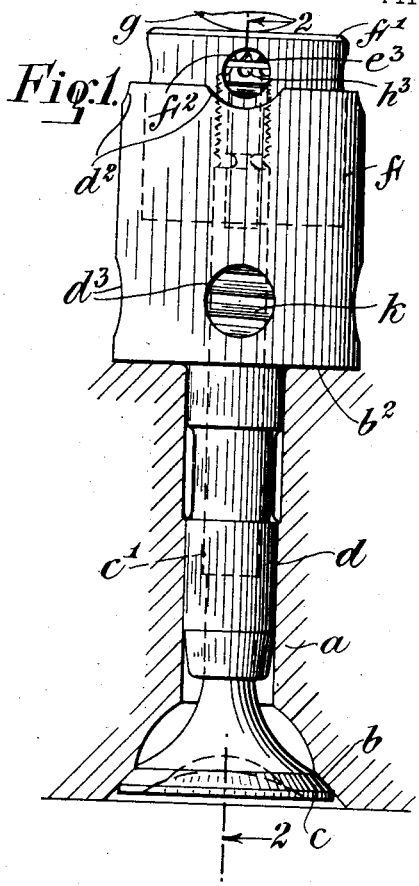
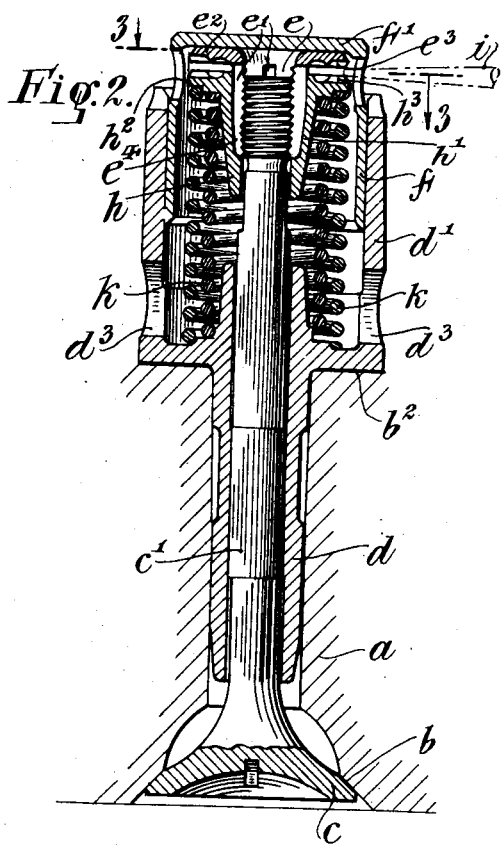
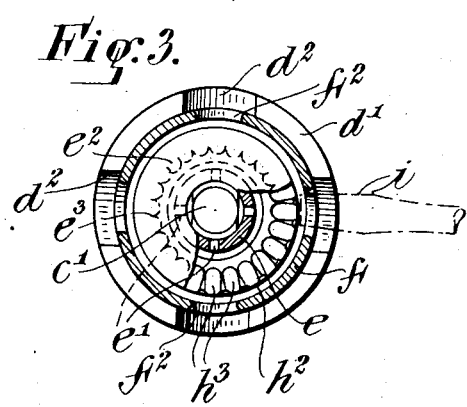
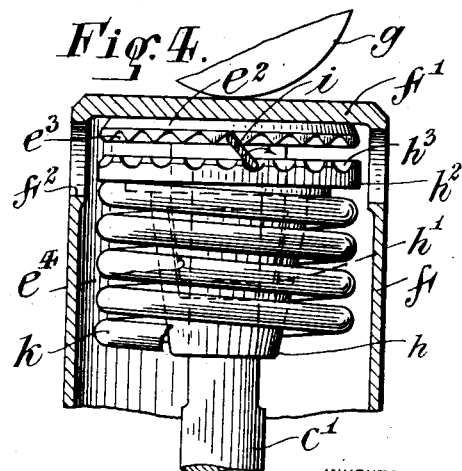
INVENTOR
Keith R. Manville
BY O'Shea & Campbell
his ATTORNEYS Patented Jan. 18, 1927.

1,614,749

UNITED STATES PATENT OFFICE.

KEITH R. MANVILLE, OF BROOKLYN, NEW YORK, ASSIGNOR TO INTERNATIONAL MOTOR COMPANY, OF NEW YORK, N. Y., A CORPORATION OF DELAWARE.

VALVE FOR INTERNAL-COMBUSTION MOTORS.

Application filed May 14, 1923. Serial No. 638,484.

This invention relates to an improved valve construction and mounting for internal combustion motors and has to do particularly with the type of valve which is operated by an overhead shaft. Two important problems are primarily sought to be solved by the invention although the construction is characterized by many features which will be pointed out hereinafter. The first problem is that of relieving the stem of the valve from the lateral thrust ordinarily imposed thereon by the side thrust of the operating cam and the second is to afford convenient and nice adjustment of the valve on its seat. In accordance with the invention the valve and its operating cam follower are so mounted and related to the guide for the valve stem as to transmit the side thrust of the operating cam directly to the guide which has a large bearing surface in the wall of the motor. The valve stem itself is thereby relieved of side thrust in the bore of its guide. The adjustment of the valve itself is effected nicely and positively by ready rotation of a nut threaded on the end of the valve stem, the friction of the valve on its seat holding the stem against rotation during rotative movement of the nut thereon. The adjustment provided may be conveniently made by the engagement of a tool of ordinary construction such as a screwdriver with the nut, the operation automatically increasing the spring pressure on the valve stem during the actual rotation of the nut. The construction whereby the desired adjustment is secured is simple and accessible, positive in action and includes provision for automatic retention of the nut in adjusted position on the valve stem during normal use of the parts. No special tools are required to effect the adjustment and no disassemblying of parts is entailed. The elements themselves are rugged and simple and so arranged that a self-grinding action is imparted to the valve and continued operation instead of resulting in ruinous wear actually improves the operating conditions. Another feature characteristic of the construction is the lightness of weight whereby inertia is reduced to the smallest possible degree during the rapid changes of direction of the cam follower and valve.

The construction will be described with refererence to one suitable embodiment illustrated in the drawings wherein:

Figure 1 is a view in side elevation showing the parts assembled, a portion of the engine wall being indicated in section to show its relation to the valve stem guide.

Figure 2 is a view in vertical section through the construction shown in Figure 1, a suitable adjusting tool being indicated in dotted lines in relation to the adjusting nut.

Figure 3 is a view partly in plan and partly in horizontal section taken on the plane indicated by the line 3—3 of Figure 2 and looking in the direction of the arrows.

Figure 4 is a fragmentary detail view in section and on a somewhat larger scale illustrating particularly the relation of an adjusting tool to the adjusting nut and its friction lock washer at the instant the nut is to be rotated on the stem.

The engine wall indicated conventionally at $a$ has formed therein a valve seat $b$ for a port which is to be controlled by a valve $c$ of conventional form, the stem $c'$ of the valve in the illustrated embodiment extending upwardly for operation on an overhead cam. In the engine wall is mounted a guide for the valve stem which includes a snugly fitting casing $d$ in which the stem slides and an enlarged cylindrical portion $d'$ which may seat on the engine wall as indicated at $b^2$ and receive certain of the operating parts to be described. On the upper end of the valve stem $c'$ is threaded an adjusting nut $e$ which is preferably split as at $e'$ to facilitate a clamping action for holding it on the stem in adjusted position, as will appear later. The end of the nut is preferably flanged as indicated at $e^2$ to provide a large bearing surface on which rests a cylindrical cam follower $f$ the side wall of which fits snugly within the casing $d'$ and the head $f'$ of which is engaged by an operating cam indicated at $g$ for operation of the valve in the manner which is understood. At the periphery of the flange $e^2$ of the nut $e$ and preferably on its underside are provided a series of grooves $e^3$ or other suitable recesses. The outer surface of the nut $e$ is preferably tapered downwardly towards the lower end as indicated at $e^4$ and encircling this portion of the nut is an elongated washer $h$ having its bore tapered similarly as indicated at $h'$ for snug frictional engagement with the split nut $e$. The washer $h$ is formed with a circular flange $h^2$ which lies directly under the flange $e^2$ of the nut $e$ but is spaced therefrom. At the periphery of the flange $h^2$ and preferably on its upper surface is formed a series of grooves $h^3$ or similar recesses for co-operation with a tool such as a screwdriver $i$ which may also be engaged with the grooves $e^3$ in the flange $e^2$ of the nut $e$ when adjustment of the nut on the valve stem is to be brought about. The underside of the flange $h^2$ of the washer $h$ affords a convenient seat for one or more valve springs $k$ which are disposed wholly within the valve stem guide $d'$ and seat on the end thereof. The follower $f$ normally extends above the upper end of the barrel $d'$ of the valve stem guide and has therein a series of openings $f^2$ through which a tool may be introduced for operative engagement with the nut $e$ when the latter is to be adjusted. It may be desirable in some constructions to provide scallops $d^2$ in the upper edge of the barrel $d'$ for alinement of the holes $f^2$ in case the follower is so positioned that the openings are not sufficiently above the upper edge of the barrel $d'$ as to admit of the introduction of a tool. Other openings $d^3$ may be formed in the side wall of the barrel $d'$ preferably adjacent its bottom to break any vacuum which might be set up during the reciprocation of the follower $f$ within the barrel $d'$ and to afford escape of accumulated oil or the like.

The action of the springs $k$ is to press the conical washer $h$ onto the outer wall of the split nut $e$ with sufficient force to clamp the nut onto the valve stem and hold it normally in adjusted position thereon. Accordingly, operation of the cam follower $f$ by the cam $g$ results in depression of the parts as a unit. By disposing the cam $g$ off the center of the valve stem follower $f$ a constant but slight rotative movement thereon may be imposed to the end that all of the parts including the valve $c$ will have a constant but slight rotation and a self-grinding action of the valve will ensue, thereby compensating for wear. If an adjustment is desired a tool of conventional form, such as a screwdriver $i$ may be introduced through one of the openings $f^2$ and engage with alined grooves $e^3$ and $h^3$. Rotation of the tool on its own axis as indicated by the arrow in Figure 4 will move the friction washer $h$ out of engagement with the split nut $e$ thereby unclamping it and simultaneously rotate the nut $e$ in one direction while rotating the washer $h$ in the opposite direction. During this movement of the tool $i$ compression of the valve spring $k$ will be transmitted through the tool to the nut $e$ thereby imposing on the valve stem $c'$ an axial force which will hold the valve $c$ on its seat during rotation of the nut $e$ on the stem. Incidentally, movement of the nut $e$ on the stem to compensate for wear on the valve will carry the washer $h$ downwardly to a corresponding degree and increase the compression of the spring $k$ as will be desirable. In this way, wear at any point is wholly taken care of.

The invention is not to be limited to the precise design since the principle may be incorporated in other embodiments.

What I claim is:

1. In combination, an adjusting nut for a valve stem, a washer encircling the nut, said nut and washer being formed on proximate opposed surfaces with recesses for mutual engagement by a tool, and springs engaging the washer to hold it yieldingly against axial movement with respect to the nut.

2. In combination, a split adjusting nut for valve stems tapered exteriorly, a tapered lock washer encircling the nut, said nut and washer being formed on opposed surfaces with recesses for mutual engagement by a tool, and springs to force the lock washer against the split nut to lock it normally and resist yieldingly axial movement of the lock washer whereby inserting a tool between the opposed surfaces and adjusting, simultaneously separates the washer from the nut.

3. A valve mounting including a valve stem guide formed with a cylindrical barrel, a cylindrical cam follower mounted to reciprocate therein and having openings in its side walls for the introduction of a tool therethrough, an adjusting nut disposed within the cam follower and threaded on the valve stem, a washer encircling the nut, said nut and washer being formed with recesses for mutual engagement by a tool inserted through said openings, and springs tending normally to oppose axial movement of the washer with respect to the nut.

This specification signed this 10th day of May, A. D. 1923.

KEITH R. MANVILLE.